United States Patent
Hong (10) Patent No.: US 7,420,601 B2
(45) Date of Patent: Sep. 2, 2008

(54) DIGITAL CAMERA AND METHOD OF CONTROLLING A DIGITAL CAMERA TO DETERMINE IMAGE SHARPNESS

(75) Inventor: Sei-won Hong, Seongnam-si (KR)

(73) Assignee: Samsung Techwin Co., Ltd., Changwon (KR)

( * ) Notice: Subject to any disclaimer, the term of this patent is extended or adjusted under 35 U.S.C. 154(b) by 732 days.

(21) Appl. No.: 10/755,650

(22) Filed: Jan. 12, 2004

(65) Prior Publication Data
US 2004/0145670 A1    Jul. 29, 2004

(30) Foreign Application Priority Data
Jan. 16, 2003  (KR) .................. 10-2003-0002956

(51) Int. Cl.
*H04N 5/208* (2006.01)
(52) U.S. Cl. .................. 348/252; 348/333.12
(58) Field of Classification Search ............ 348/333.01, 348/333.02, 333.11, 333.12, 252, 222.1; 382/118, 165, 173, 174, 189, 199, 203, 282, 382/298, 266, 267, 268, 269
See application file for complete search history.

(56) References Cited

U.S. PATENT DOCUMENTS

| | | | |
|---|---|---|---|
| 5,835,616 A | 11/1998 | Lobo et al. | |
| 6,463,163 B1 | 10/2002 | Kresch | |
| 6,597,736 B1 * | 7/2003 | Fadel | 375/240.01 |
| 6,801,642 B2 * | 10/2004 | Gorday et al. | 382/118 |
| 6,816,626 B1 * | 11/2004 | Fadel | 382/282 |
| 7,035,456 B2 * | 4/2006 | Lestideau | 382/164 |
| 7,154,544 B2 * | 12/2006 | Kowno et al. | 348/240.99 |
| 2002/0181784 A1 * | 12/2002 | Shiratani | 382/218 |

FOREIGN PATENT DOCUMENTS

KR    1999-31720 A    5/1999

* cited by examiner

*Primary Examiner*—Tuan V Ho
(74) *Attorney, Agent, or Firm*—Drinker Biddle & Reath LLP (57) ABSTRACT

Provided is a method of controlling a digital camera to enlarge part of an object included in a captured image and display the enlarged part of the captured image on a screen so that the user determines sharpness of the image, which includes determining whether a human face is included in the captured image, selecting the human face in the captured image as a region to be enlarged, dividing the captured image into at least two regions and selecting one of the regions having the largest amount of edge information as a region to be enlarged, enlarging the region selected in the selection step or the dividing and selection steps, and displaying the image enlarged in the enlargement step on a screen.

19 Claims, 10 Drawing Sheets

DIGITAL CAMERA AND METHOD OF CONTROLLING A DIGITAL CAMERA TO DETERMINE IMAGE SHARPNESS

BACKGROUND OF THE INVENTION

This application claims the priority of Korean Patent Application No. 2003-2956, filed on 16 Jan. 2003, in the Korean Intellectual Property Office, the disclosure of which is incorporated herein in its entirety by reference.

1. Field of the Invention

The present invention relates to a digital camera and a method of controlling the digital camera, and more particularly, to a digital camera and a method of controlling the digital camera to display an enlarged part of a captured image on a screen so that a user can determine the sharpness of the image.

2. Description of the Related Art

In a conventional digital camera, the sharpness of a captured image is determined by displaying the image on a display device such as a liquid crystal display (LCD) panel and allowing a user to determine the sharpness of the image by viewing the display image.

However, according to this conventional method of determining sharpness of an image in a digital camera, a relatively large image may be displayed on a display device such as an LCD panel having a relatively small size. Thus, it can be difficult to determine the sharpness of the image.

Another method of determining the sharpness of an image involves enlarging each image by changing a camera mode to a playback mode after an image is captured in a digital camera. However, since an additional user manipulation is needed after the image is captured, it is inconvenient for a user to determine the sharpness of the image.

U.S. Pat. No. 6,463,163 discloses a system and method for face detection using candidate image region selection, in which an input image is pre-filtered by utilizing a candidate selector to select candidate regions of the input image that potentially contains a picture of a human face. U.S. Pat. No. 5,835,616 discloses an image processing method for detecting human figures in a digital image, in which a human face is automatically detected from a digital image using templates. However, the teaching of these patents does not include a method of controlling a digital camera to determine sharpness of an image as revealed in the present invention.

SUMMARY OF THE INVENTION

To solve the above and/or other problems, the present invention provides a digital camera and method of controlling a digital camera so that a user can determine the sharpness of an image.

According to an aspect of the present invention, a method of controlling a digital camera to enlarge part of an object included in a captured image and display the enlarged part of the captured image on a screen so that the user determines sharpness of the image, the method comprising determining whether a human face is included in the captured image, selecting the human face in the captured image as a region to be enlarged, dividing the captured image into at least two regions and selecting one of the regions having the largest amount of edge information as a region to be enlarged, enlarging the region selected in the selection step or the dividing and selection steps, and displaying the image enlarged in the enlargement step on a screen.

According to another aspect of the present invention, a digital camera including an optical system having a plurality of lenses and optically processing light from an object, an optoelectric converting portion converting light from the optical system to an electric analog signal, an analog-to-digital converting portion converting the analog signal from the optoelectric converting portion to a digital signal, a digital signal processor processing the digital signal from the analog-to-digital converting portion to provide the processed digital signal to a user, a display device displaying an image of the object on a screen according to the digital signal from the digital signal processor, and a control portion controlling an overall operation, to enlarge part of the object included in the image and display the enlarged image on the screen so that the user determines sharpness of the image, in which, when a human face is included in the image, the human face is displayed on the screen by being enlarged, and when the human face is not included in the image, the image is divided into at least two regions and one of the regions having the largest amount of edge information is enlarged and displayed on the screen.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

Figure 1:
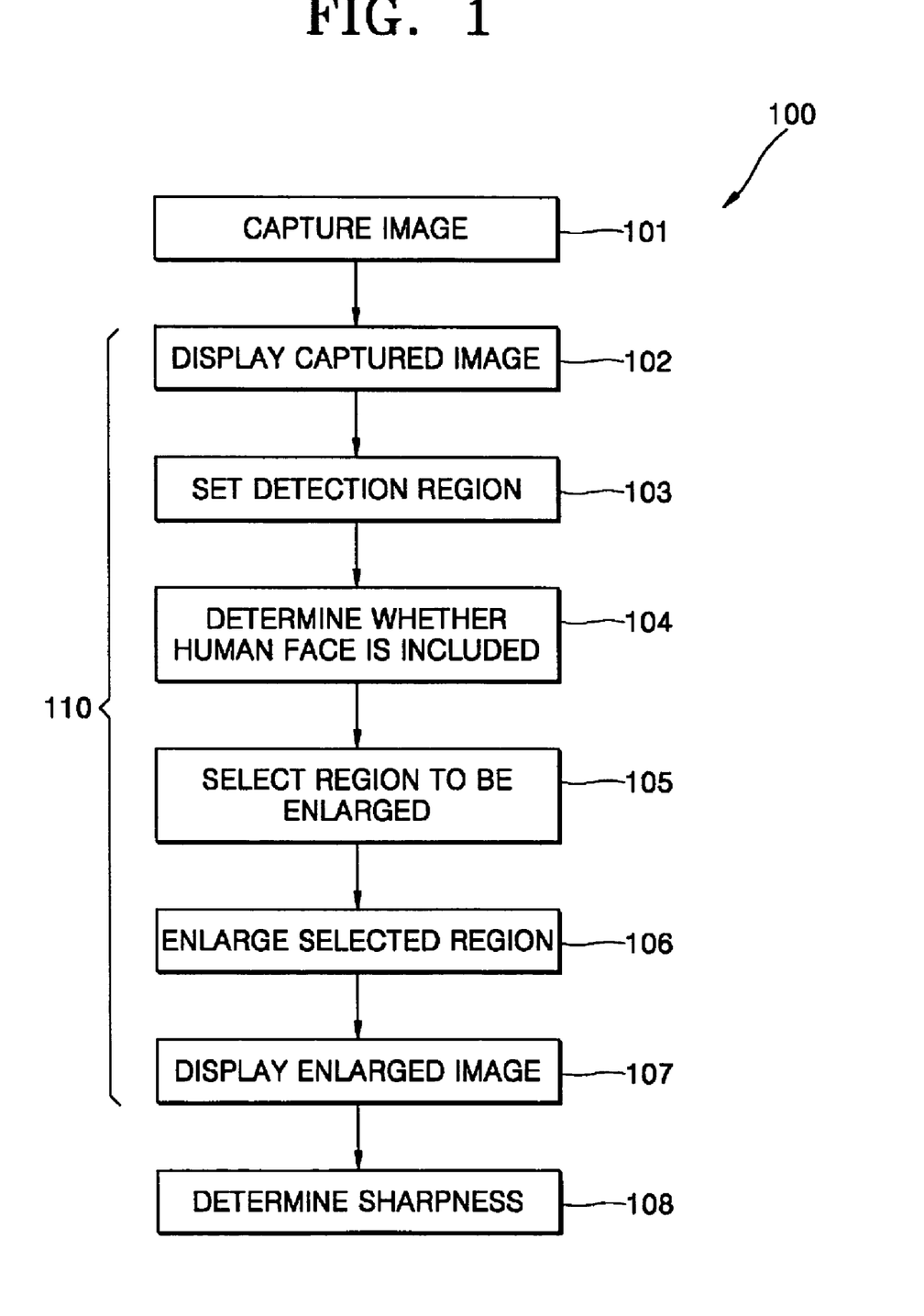
FIG. 1 is a flow chart for explaining a method of determining sharpness of an image in a method of controlling a digital camera according to a preferred embodiment of the present invention.

FIG. 1 reveals a method (110) of controlling a digital camera to determine sharpness of an image according to a preferred embodiment of the present invention. The digital camera control method 110, displays part of an object included in a captured image by enlarging the same so that a user can determine the sharpness of the captured image. The digital camera control method 110 includes a human face inclusion determination step 104, a selection step 105, a selected region enlargement step 106, and an enlarged image display step 107.

In the human face inclusion determination step 104, it is determined whether a human face is included in the captured image. In the selection step 105, when the captured image includes a human face, the human face is selected as a region to be enlarged. When the captured image does not include a human face, the captured image is divided into at least two regions and one of the regions having the largest amount of edge information is selected as a region to be enlarged. In the selected region enlargement step 106, the region selected in the selection step 105 is enlarged. In the enlarged image display step 107, the image enlarged in the selected region enlargement step 106 is displayed on a screen.

According to the method of controlling a digital camera to determine sharpness of an image as in the present invention, when an image captured by an image capture apparatus such as a digital camera is displayed on the screen for review, part of an object, such as a human face, is automatically enlarged so that the user may determine sharpness of the image. Thus, the sharpness of the captured image is simply and easily determined.

In the method of controlling a digital camera to determine sharpness of an image according to the present invention, the sharpness of an image is easily determined by enlarging a particular part of a captured image. Although a user may be able to determine the sharpness of an image displayed on the screen with the naked eye, the sharpness of an image can also be determined by processing a captured image in a digital camera. It is more efficient to determine sharpness from a particular part of an image rather than from the entire captured image. In particular, when a particular part of an image is enlarged, the sharpness of an image can be more clearly determined.

It is preferable to determine sharpness by enlarging the facial portion of a human image, in which a change on the screen can be easily recognized, rather than by enlarging a background section where a change on the screen is relatively small. In the case in which the captured image does not include a figure, the image of an object is divided into a few regions and sharpness is determined by enlarging the region among the divided regions that has the largest amount of edge information.

In the selected region enlargement step 106, the method of selecting a region to be enlarged varies according to whether a human face is included in the captured image. Whether a human face is included in the captured image is determined in the human face inclusion determination step 104 and the result of the determination is provided to the selection step 105. An image capture step 101 is performed prior to the above steps.

In the human face inclusion determination step 104, information on color of the captured image is obtained. The human face is preferably detected by comparing the color information from the image with skin tone information in order to determine whether a human face is included in the captured image.

It is preferable that a step 103 of setting a region to detect a human face in the captured image is further provided. Thus, in the human face inclusion determination step 104, a human face is searched only in the region set in the detection region setting step 103. That is, although it is possible to search the every region of the captured image for a human face, a human face is preferably searched for in a particular region of the captured image by including the detection region setting step 103 prior to the human face inclusion determination step 104. This is because searching a particular region is more economical than searching the entire region of the screen to detect a human face. For example, when the size of a captured image displayed on a screen such as an LCD panel is about 130,000 pixels, the region in which a human face is searched may have a size of about 50,000 pixels when the region is a center portion. Since a smaller region is searched compared to the entire screen, the amount of image data to be searched decreases accordingly so that search can be conducted in an economical manner.

It is usually preferable that the central portion of the screen is set as a region to detect a human face. When an image is captured by using an image capture apparatus such as a digital camera, a human face is typically an important subject so that a human face is often located at the central portion of the image. Also, when the face is not included in the captured image, an important portion is often located at the central portion of the image.

Although, in the detection region setting step 103, a region for detecting a human face can be automatically and internally set, the region to detect a human face can also be set by a user in a region displayed on the screen. When the user directly sets a region to detect a human face, a step 102 of displaying the captured image on the screen is preferably provided prior to the detection region setting step 103 so that the user can select the region while reviewing the captured image on the screen.

In the selection step 105, a region to be enlarged is selected based on whether a human face is included in the capture image. The method of selecting a region to be enlarged varies according to the determination in the human face inclusion determination step 104. That is, when a human face is included in the captured image, a T shaped portion formed by the eyes, nose, and mouth on a human face is searched and the T shaped portion is preferably selected as the region to be enlarged. When a human face is not included in the captured image, the captured image is divided into at least two regions and one of the regions having the largest amount of edge information is preferably selected as the region to be enlarged.

In the selected region enlargement step 106, the selected region is enlarged in different methods according to whether a human face is included in the captured image in the selection step 105.

In the enlarged image display step 107, an image enlarged in the selected region enlargement region 106 is displayed on the screen so that the user can determine sharpness of the enlarged image while directly viewing the image with the naked eye in a step 108 of determining sharpness.

In the sharpness determination step 108, the sharpness of the captured image is determined from the image region enlarged in the selected region enlargement step 106. For this purpose, although the sharpness can be automatically determined in the digital camera in a well-known determination sharpness method, the sharpness can be determined with the user's own eyes so that the method of determining sharpness according to the present invention can be realized in a simpler manner.

In the method of controlling a digital camera to determine sharpness of an image according to the present invention, a face detection algorithm is used when a human face is included in a captured image. The face detection algorithm includes a detection region setting step, a human face inclusion determination step, a human face detection step, a T shape search step, and a T shape region expansion step. The detection region setting step may be omitted according to a method to be used.

Figure 2:
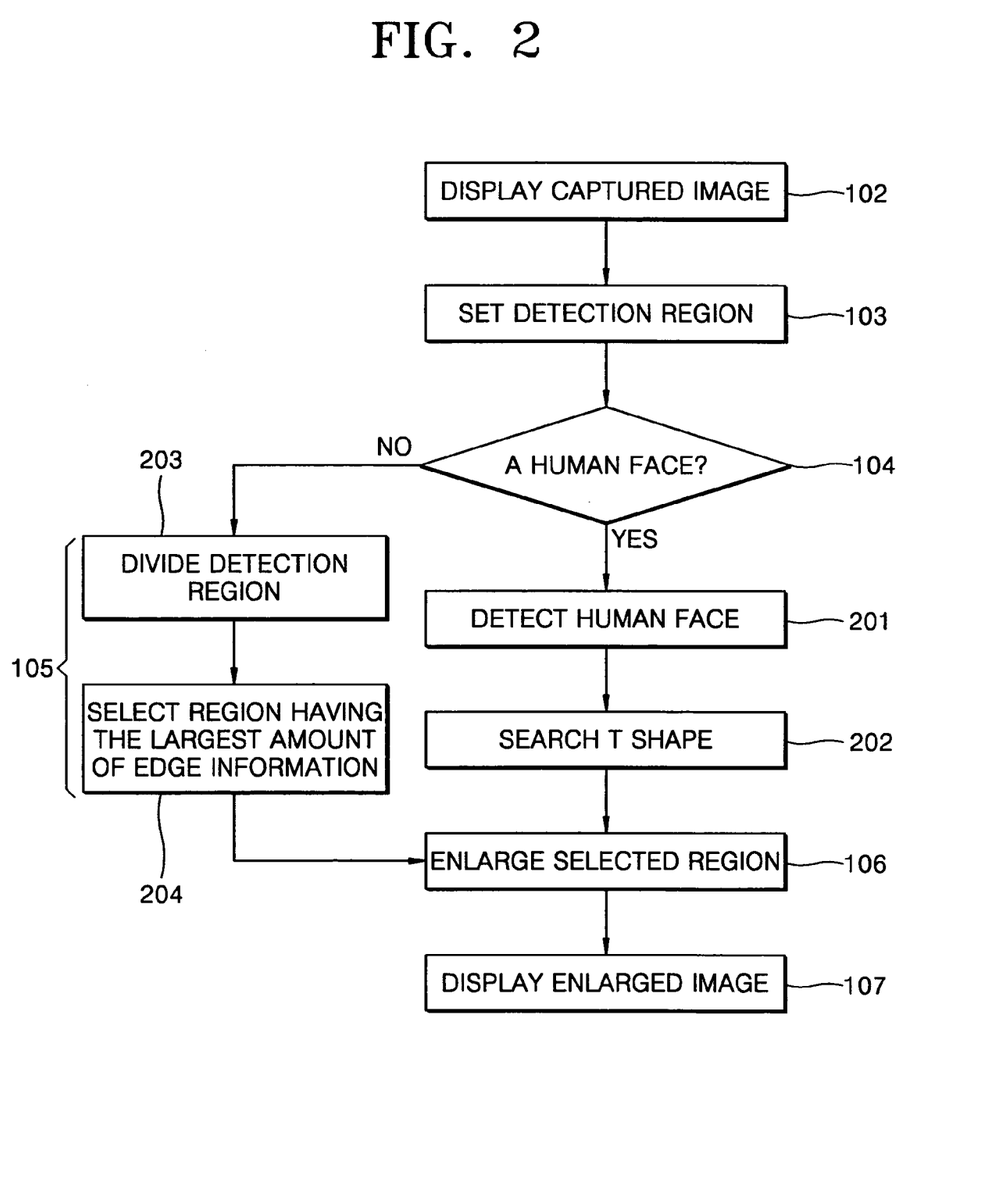
FIG. 2 is a flow chart for explaining a method of controlling a digital camera in which the selection step of FIG. 1 is shown in detail according to whether a human face is included.

FIG. 2 is a flow chart for explaining a method of controlling a digital camera in which the selection step 105 of FIG. 1 is shown in detail. The nature of the selection step 105 depends on whether a human face is included. FIGS. 3A through 3E are views illustrating the steps performed by the digital camera controlling method of FIG. 1 when a human face is included in a captured image. FIGS. 4A through 4D are views illustrating the steps performed by the digital camera controlling method of FIG. 1 when a human face is not included in a captured image.

Referring to the drawings, the selection step 105 may include a human face detection step 201, a T shape search step 202, a detection region dividing step 203, and a step 204 of selecting a region having the largest amount of edge information. In the drawings, a case is shown in which the detection region setting step 103 is provided so as to search only a partial region of the captured image when whether a human face is included in a captured image is determined prior to the selection step 105 in the image sharpness determination method.

When a human face is included in the captured image according to the determination of the human face inclusion determination step 104, the selection step 105 includes the human face detection step 201 and the T shape search step 202. Also, when a human face is not included in the captured image, the selection step 105 includes the detection region dividing step 203 and the step 204 of selecting a region having the largest amount of edge information.

In the human face detection step 201, when a human face is included in the captured image, the human face is detected from the captured image. For this purpose, a range of information on the color of a human skin and the shape of a face are set. In the detection region setting step 103, the set detection region is searched and the human face is found.

The human face detection step 201 can be simultaneously performed in the human face inclusion determination step 104. That is, a human face is searched based on the human skin color information range and the human face shape in the human face inclusion determination step 104. When the human face is found, the human face is selected as a region to be enlarged. When, the human face is not found, the detection region dividing step 203 and the step 204 of selecting a region having the largest amount of edge information are performed so that a region to be enlarged is selected. In doing so, it is assumed that the shape of a human face is typically oval.

In the T shape search step 202, a T-shaped portion formed by the eyes, nose, and mouth on the human face is searched and the T-shaped portion is selected as a region to be enlarged. The T-shaped portion is enlarged in the selected region enlargement step 106. The sharpness of the T-shaped portion, rather than that of the entire human face, becomes clearer to a user. Typically, the T-shaped portion formed by the eyes, nose, and mouth and the oval shape of a face can be maintained uniformly when the face is viewed at various angles.

Even when the face region selected in the human face detection step 201 is enlarged in the selected region enlargement step 106 without performing the T shape search step 202, the effect of the present invention is sufficiently achieved.

Figure 3A:
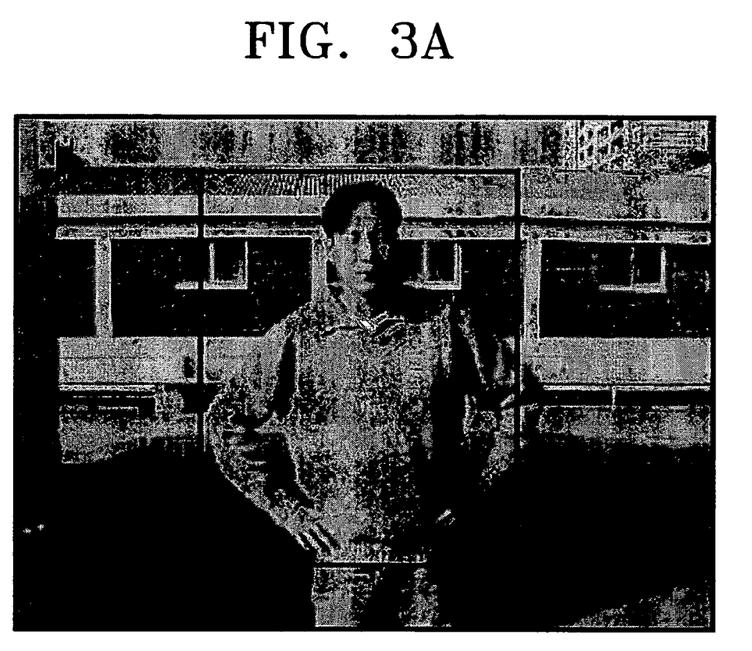
FIGS. 3A through 3E are views illustrating the steps performed by the digital camera controlling method of FIG. 1 when a human face is included in a captured image.
Figure 3B:
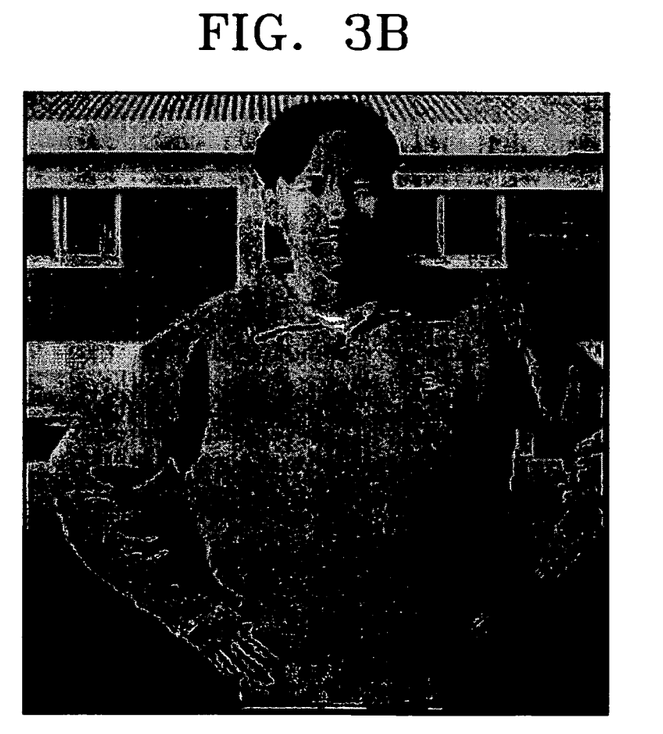

FIG. 3A shows that an image captured in the captured image display step 102 is displayed and a central portion of the entire captured image is selected in the detection region setting step 103 as a region to be detected. FIG. 3B shows that only the selected detection region of FIG. 3A is enlarged.

Figure 3C:
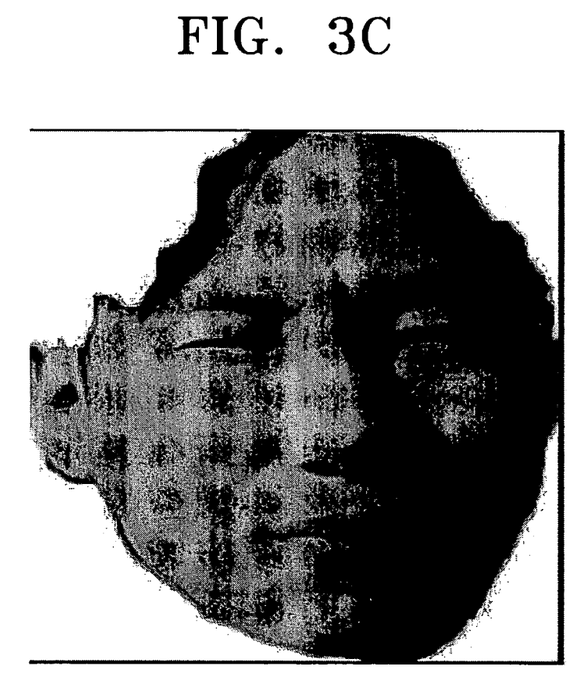
Figure 3D:
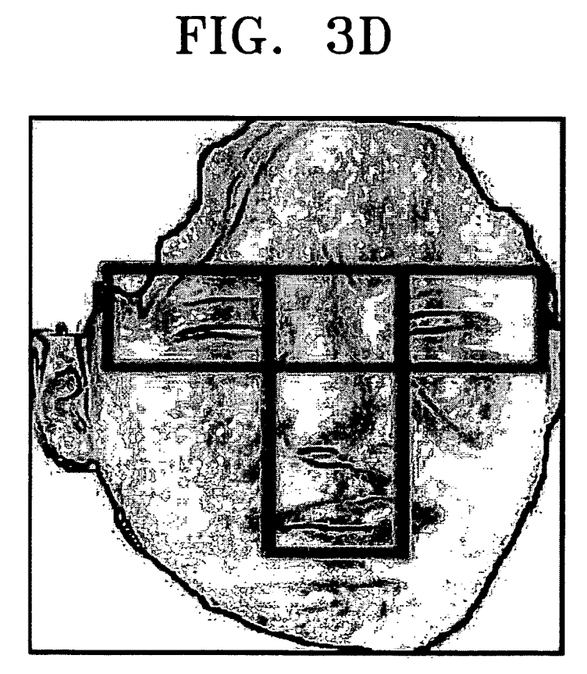
Figure 3E:
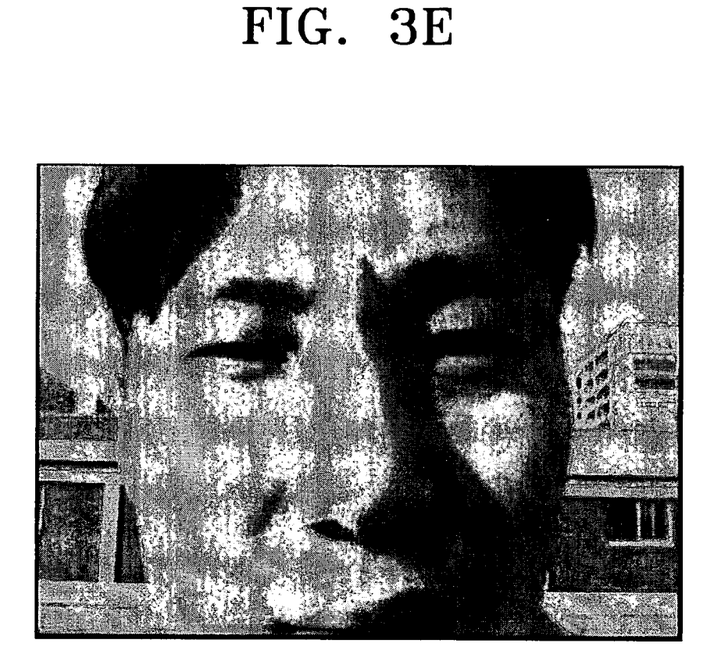

FIG. 3C shows an enlarged human face of the image of FIG. 3B detected in the human face detection step 201. FIG. 3D shows that the T-shaped portion formed by the eyes, nose, and mouth is searched in the T shape search step 202. FIG. 3E shows the T-shaped portion of FIG. 3D by enlarging the same in the selected region enlargement step 106.

When the human face is not included in the captured image, the selection step 105 preferably includes the detection region dividing step 203 and the step 204 of selecting a region having the largest amount of edge information so that the captured image is divided into at least two regions and one of the regions having the largest amount of edge information is selected as a region to be enlarged.

In the detection region dividing step 203, the detection region formed by the central portion selected in the captured image in the detection region setting step 103 is divided into at least two regions. In the present preferred embodiment, the detection region is divided into two regions in a horizontal direction and three regions in a vertical direction so as to be a total of six regions.

In the step 204 of selecting a region having the largest amount of edge information, the respective divided regions are searched to find a region having the largest amount of edge information. Then, the searched region is selected as a region to be enlarged in the selection region enlargement step 106. In the present preferred embodiment in which the detection region is divided into six regions, since a right middle region has the largest amount of edge information formed by the leaves, the right middle region is selected as a region to be enlarged.

Figure 4A:
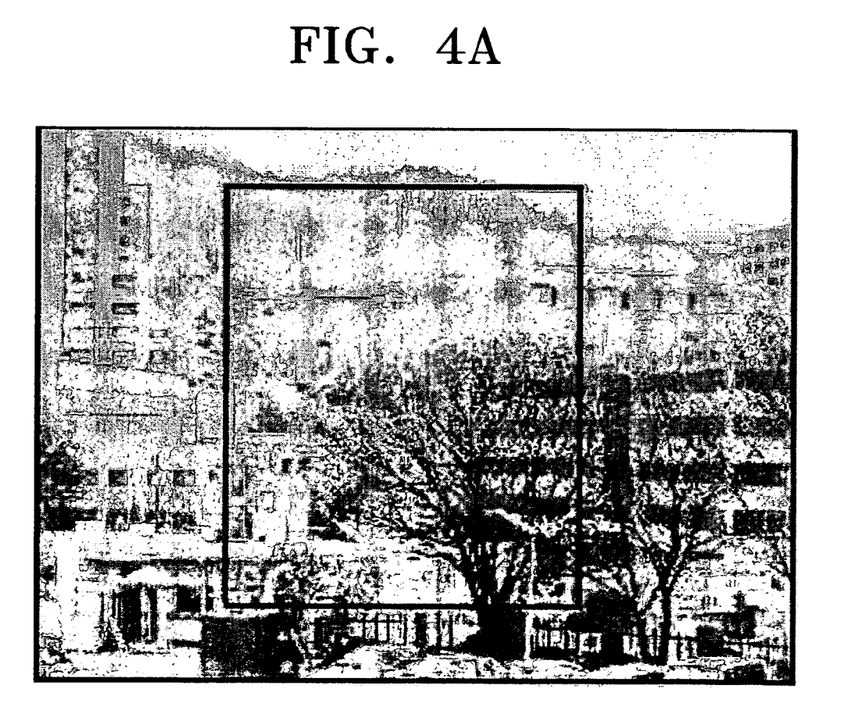
FIGS. 4A through 4D are views illustrating the steps performed by the digital camera controlling method of FIG. 1 when a human face is not included in a captured image.
Figure 4B:
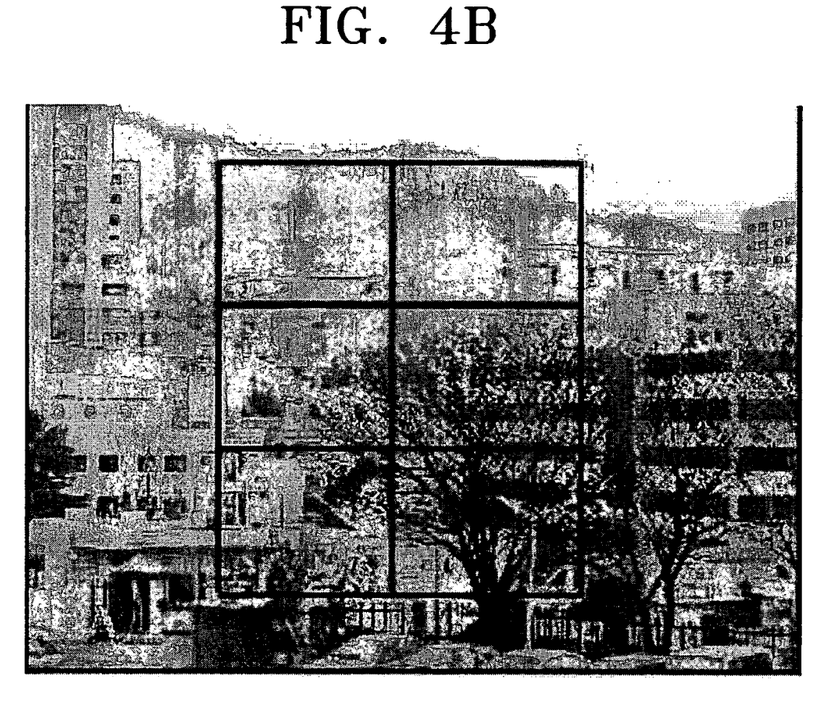

FIG. 4A shows an image captured in the captured image display step 102 and the central portion of the entire captured image selected as a detection region in the detection region setting step 103. FIG. 4B shows that the detection region selected in FIG. 4A is divided into six regions.

Figure 4C:
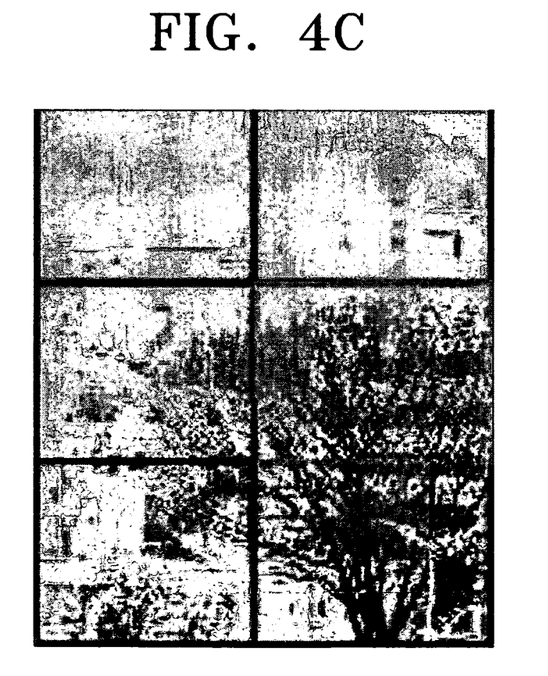
Figure 4D:
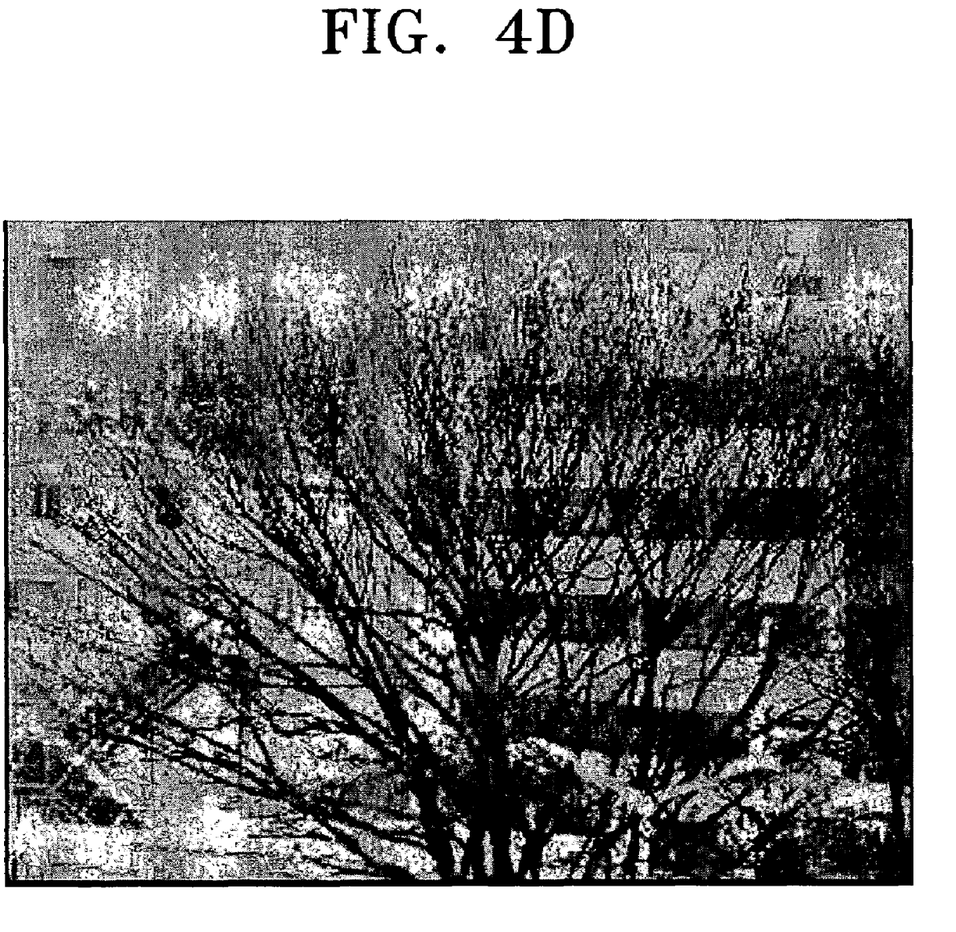

FIG. 4C shows the detection region selected as shown in FIG. 4A and divided as shown in FIG. 4B by enlarging the same. FIG. 4D shows that a region having the largest amount of edge information is searched in the six divided regions, a right middle region having the largest amount of edge information is selected, and the selected region is enlarged in the selected region enlargement step 106.

Figure 5:
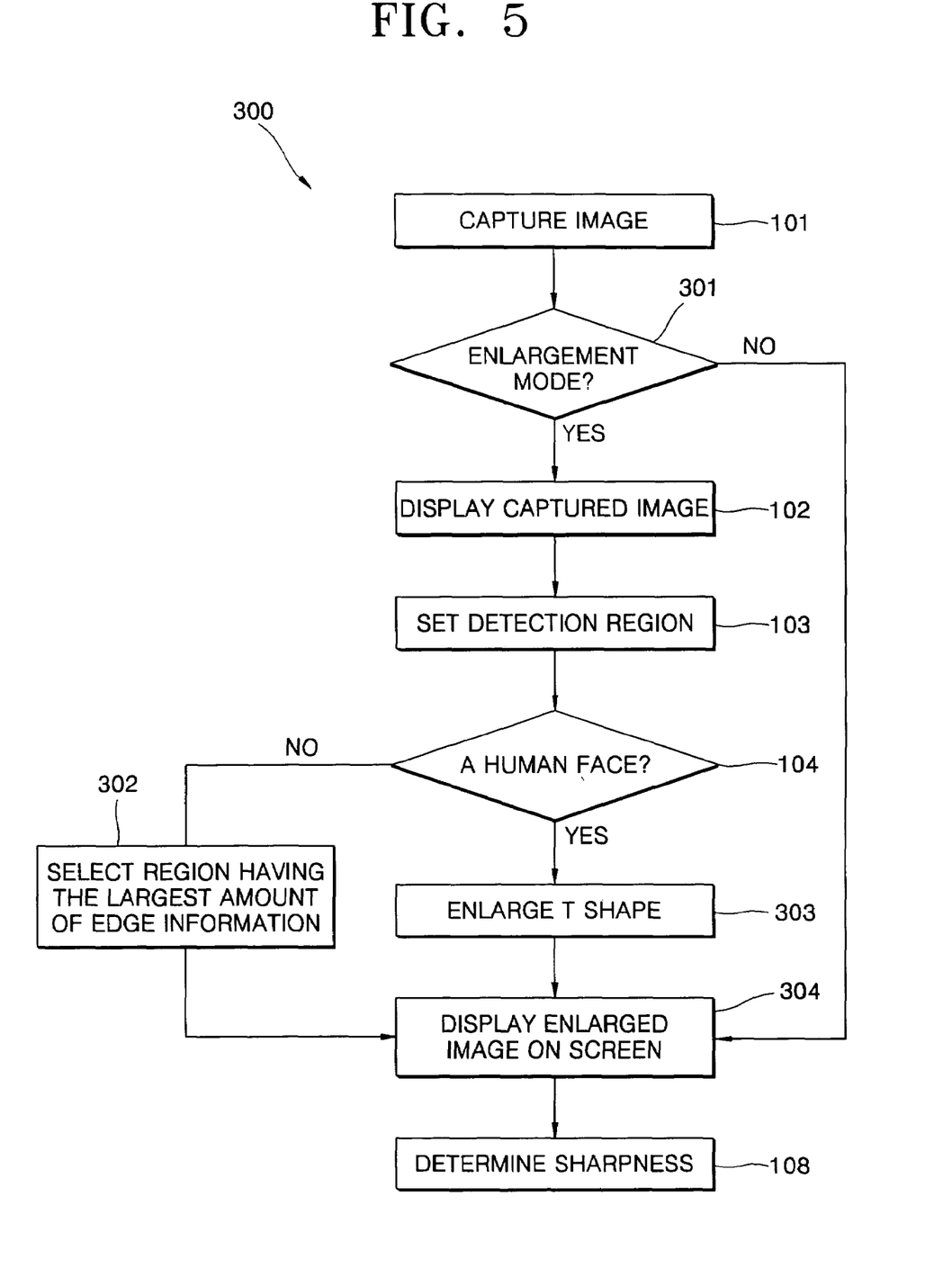
FIG. 5 is a flow chart for explaining a method of determining sharpness of an image in a method of controlling a digital camera according to another preferred embodiment of the present invention.

FIG. 5 is a flow chart for explaining a method of determining sharpness of an image in a method of controlling a digital camera according to another preferred embodiment of the present invention.

Referring to FIG. 5, an image sharpness determination method 300 of a digital camera includes an image capture step 101, an enlargement mode selection determination step 301, an captured image display step 102, a detection region selection step 103, a human face inclusion determination step 104, a step 108 of enlarging a region having the largest amount of edge information, a T-shape enlargement step 303, a display step 304, and a sharpness determination step 108. In the present preferred embodiment, the constituent elements having the same reference numerals as those shown in FIG. 1 are the same elements having the same functions so that detailed descriptions thereof will be omitted.

In the enlargement mode selection determination step 301, a user can select an enlargement mode for determination of sharpness and whether the user selects the enlargement mode is determined. When the enlargement mode is selected, a particular portion is enlarged according to whether a human face is included in an captured image and the enlarged image is displayed on the screen so that the user can determine sharpness. When the enlargement mode is not selected, the particular portion is not enlarged and directly displayed on the screen so that the user can determine sharpness.

In the step 302 of enlarging a region having the largest amount of edge information, according to the determination on the inclusion of a human face, when the human face is not included, a detection region is divided into at least two regions and one of the regions having the largest amount of edge information is enlarged.

In the T-shape enlargement step 303, when the human face is included, the human face is detected by using color information and shape information of the human face. A T-shaped portion of the detected human face which is formed by the eyes, nose, and mouth is selected and enlarged.

In the display step 304, the region enlarged in the step 302 of enlarging a region having the largest amount of edge information or the T-shape enlargement step 303 is displayed on the screen. When the enlargement mode is not selected in the enlargement mode selection determination step 301, the region is not enlarged and the captured image is displayed on the screen without enlargement as it is.

In a method of controlling a digital camera to determine sharpness of an image according to the present invention, when an image obtained by an image capture apparatus such as a digital camera is displayed on the screen for review, a portion of an object, for example, a human face, is automatically enlarged so that a user can easily and conveniently determine sharpness of the image.

A digital camera employing the method of controlling of a digital camera to determine sharpness of an image which is described above with reference to FIGS. 1 through 5 is described with reference to FIGS. 6 through 8. The operation of the digital camera is performed in the digital camera controlling method described in FIGS. 1 through 5. Detailed descriptions on the same contents are omitted herein.

Figure 6:
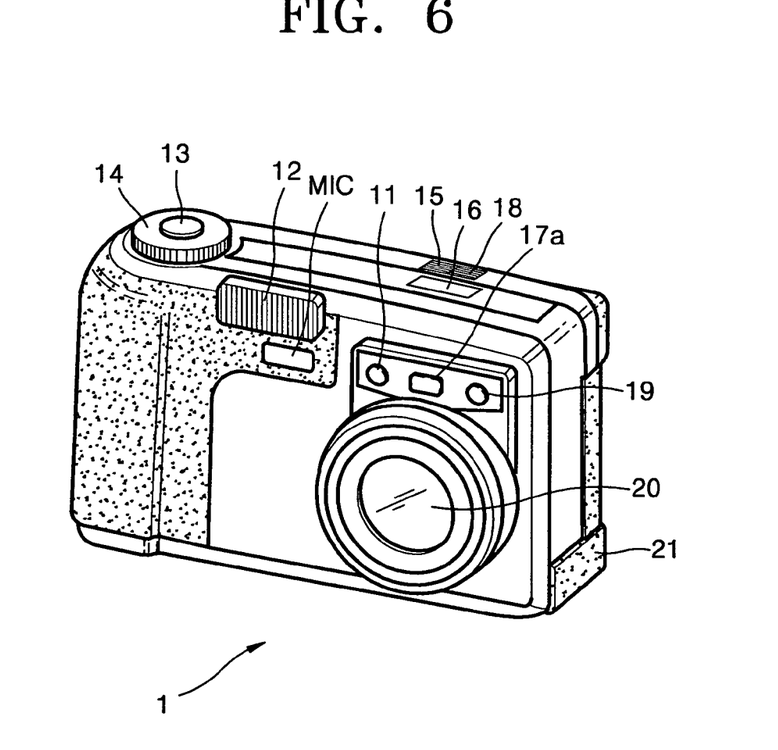
FIG. 6 is a perspective view illustrating the front appearance of a digital camera according to a preferred embodiment of the present invention.

FIG. 6 is a perspective view illustrating the front appearance of a digital camera according to a preferred embodiment of the present invention. Referring to FIG. 6, a microphone MIC, a self-timer lamp 11, a flash 12, a shutter button 13, a mode dial 14, a function selection button 15, a photographing information display portion 16, a viewfinder 17a, a function block button 18, a flash light amount sensor 19, a lens portion 20, and an external interface portion 21 are provided in the front side of a digital camera 1 according to a preferred embodiment of the present invention.

The self-timer lamp 11 flickers in a self-timer mode during a set time after the shutter button 13 is pressed until the photographing starts. The mode dial 14 is used for a user to set a variety of modes, for example, a still image photographing mode, a night view photographing mode, a motion picture photographing mode, a reproduction mode, a computer connection mode, and a system setting mode. The function selection button 15 is used for the user to select one of operational modes of the digital camera 1, for example, the still image photographing mode, the night view photographing mode, the motion picture photographing mode, and the reproduction mode. The photographing information display portion 16 displays information of the respective functions related to photographing. The function block button 18 is used for the user to select each function displayed on the photographing information display portion 16.

The enlargement mode shown in FIG. 5 can be selected by using the mode dial 14 or the function selection button 15.

Figure 7:
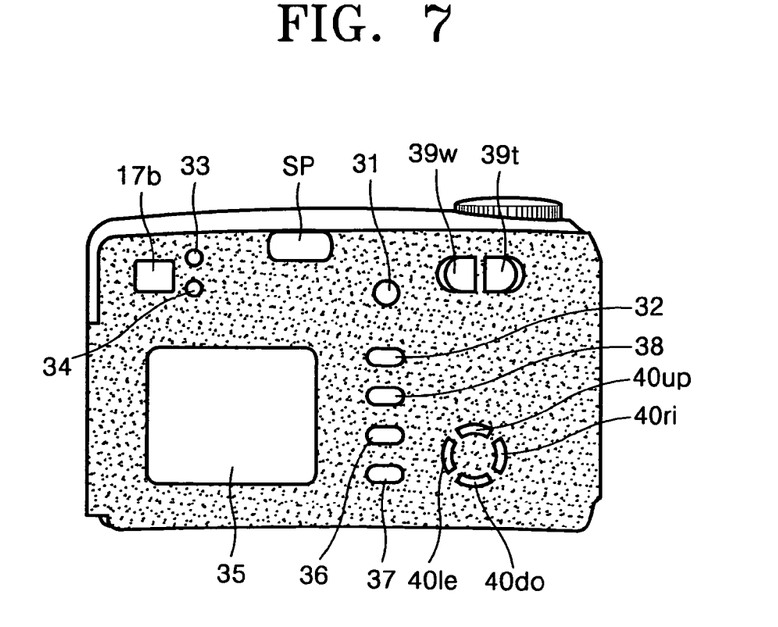
FIG. 7 is a rear view of the digital camera of FIG. 6.

FIG. 7 is a rear view of the digital camera of FIG. 6. Referring to FIG. 7, a speaker SP, a power button 31, a monitor button 32, an auto-focus lamp 33, a viewfinder 17b, a flash ready lamp 34, a display panel 35, a confirm/delete button 36, an enter/play button 37, a menu button 38, a wide angle zoom button 39w, a telephoto zoom button 39t, an up movement button 40up, a right movement button 40ri, a down movement button 40do, and a left movement button 40le are arranged on the rear side of the digital camera 1 according to the present invention.

The monitor button 32 is used to control the operation of the display panel 35. For example, when the monitor button 32 is first pressed, an image of an object pictured and photographing information thereof are displayed on the display panel 35. When the monitor button 32 is second pressed, only an image of the pictured object is displayed on the display panel 35. When the monitor button 32 is third pressed, power applied to the display panel 35 is cut off. The auto-focus lamp 33 is operated when an input image is well focused. The flash ready lamp 34 is operated when the flash 12 of FIG. 6 is in a ready mode. The confirm/delete button 36 is used as a confirm button or a delete button in the process in which the user sets each mode. The enter/play button 37 is used for the user to input data or for the function of stop or reproduction in a reproduction mode. The menu button 38 is used to display menu of a mode selected by the mode dial 14. The up movement button 40up, the right movement button 40ri, the down movement button 40do, and the left movement button 40le are used in the process in which the user sets each mode.

Figure 8:
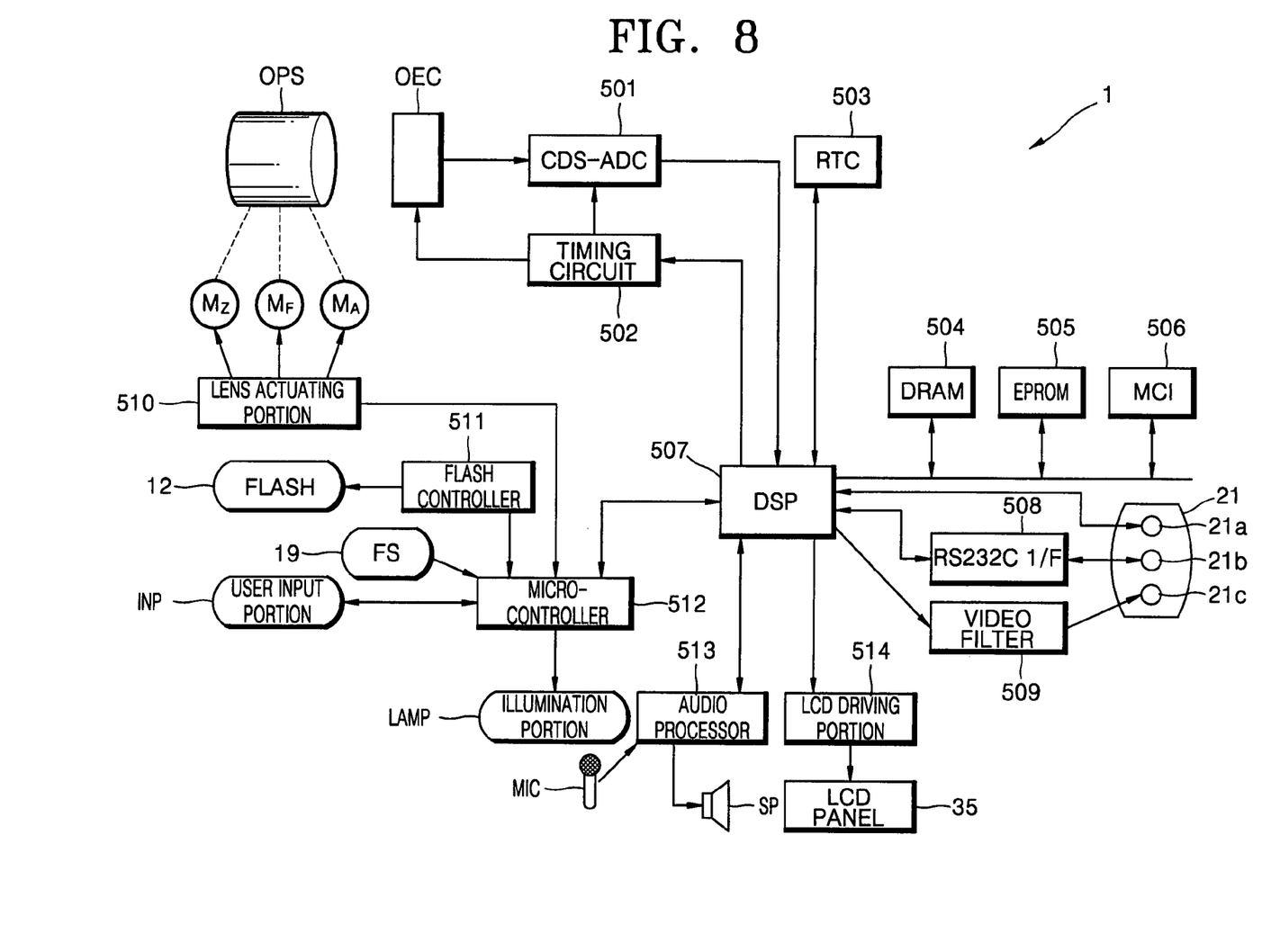
FIG. 8 is a block diagram illustrating the overall configuration of the digital camera of FIG. 6.

The overall structure of the digital camera of FIG. 6 is shown in FIG. 8. referring to FIG. 8, to enlarge part of an object included in the image and display the enlarged image on the screen, the digital camera 1 according to a preferred embodiment of the present invention includes an optical system OPS, an optoelectric converting portion OEC, an analog-to-digital converting portion 501, a digital signal processor (DSP) 507, the display panel 35, and a microcontroller 512.

The optical system OPS includes a plurality of lenses to optically process light from an object to be photographed. The optoelectric converting portion OEC converts light from the optical system OPS to an electric analog signal. The analog-to-digital converting portion 501 converts an analog signal from the optoelectric converting portion OEC to a digital signal. The digital signal processor 507 processes the digital signal from the analog-to-digital converting portion 501 to provide the processed digital signal to a user. The display panel 35 displays an image of the object on the screen according to the digital signal from the digital signal processor 507. The controller 512 controls the overall operation.

When a human face is included in the image, the human face is displayed on the screen by being enlarged. When the human face is not included in the image, the image is divided into at least two regions and one of the regions having the largest amount of edge information is displayed on the screen. The above operations are preferably performed by the digital signal processor 507 or the controller 512.

When the human face is included in the image, a T-shaped portion formed by the eyes, nose, and mouth on the human face is searched and the T-shaped portion is displayed on the screen by being enlarged.

The central portion of the image displayed on the screen is set as a region where the human face is to be detected. Preferably, the human face is searched only in the set region to determine whether the human face is included in the captured image.

The optical system OPS including a lens portion and a filter portion optically processes light from an object to be photographed. The lens portion in the optical system OPS includes a zoom lens, a focus lens, and a compensation lens.

The optoelectric converting portion OEC of a charge coupled device (CCD) or complementary metal-oxide-semiconductor (CMOS) converts light from the optical system OPS to an electric analog signal. The digital signal processor 507 controls the operation of the OEC and an analog-to-digital converting portion. The correlation double sampler and analog-to-digital converter (CDS-ADC) device 501 as the analog-to-digital converting portion processes an analog signal from the optoelectric converting portion OEC to remove a high frequency noise and adjust amplitude thereof, and converts the processed analog signal to a digital signal. The digital signal processor 507 generates a digital image signal classified by brightness and chromaticity signals, by processing the digital signal from the CDS-ADC device 501.

The digital image signal from the digital signal processor 507 is temporarily stored in a DRAM 504. The algorithm and set data needed for the operation of the digital signal processor 507 is stored in an EPROM 505. A memory card of a user is inserted in or detached from a memory card interface 506.

A digital image signal from the digital signal processor 507 is input to a LCD driving portion 514 so that an image is displayed on the display panel 35 such as a color LCD panel.

The digital image signal from the digital signal processor 507 can be transmitted through a USB (universal serial bus) connection portion 21a and an RS232C interface 508 and a connection portion 21b thereof, as a serial communication, and a video filter 509 and a video output portion 21c, as a video signal.

An audio processor 513 outputs a voice signal from a microphone MIC to the digital signal processor 507 or the speaker SP and outputs an audio signal from the digital signal processor 507 to the speaker SP.

The user input portion INP includes the shutter button 13 of FIG. 6, the mode dial 14 of FIG. 6, the function selection button 15 of FIG. 6, the function block button 18 of FIG. 6, the monitor button 32 of FIG. 7, the confirm/delete button 36 of FIG. 7, the enter/play button 37 of FIG. 7, the menu button 38 of FIG. 7, the wide angle zoom button 39w of FIG. 7, the telephoto zoom button 39t of FIG. 7, the up movement button 40up of FIG. 7, the right movement button 40ri of FIG. 7, the down movement button 40do of FIG. 7, and the left movement button 40le of FIG. 7.

The microcontroller 512 controls the lens actuating portion 510 and accordingly a zoom motor $M_Z$, a focus motor $M_F$, and an aperture motor $M_A$ respectively drive the zoom lens, the focus lens, and the aperture in the OPS. A illumination portion LAMP driven by the microcontroller 512 includes the self-timer lamp 11, the auto focus lamp 33 of FIG. 7, and a flash ready lamp 34 of FIG. 7. The microcontroller 512 controls the operation of the flash controller 511 according to the signal from the flash light amount sensor 19.

The method of controlling a digital camera to determine sharpness of an image according to the present invention can be applied not only to a digital camera but also to an image capture apparatus to capture and store an image. In the present specification, however, the present description is based on a typical digital camera to which the digital camera control method according to the present invention can be applied.

As described above, according to the digital camera and control method thereof to determine sharpness of an image according to the present invention, the sharpness of an image captured by an image capture apparatus such as a digital camera can be easily determined.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A method of controlling a digital camera so that a user may determine sharpness of a digital image, the method comprising:
   setting a predetermined face detection region in the digital image, the face detection region being smaller than the digital image;
   determining whether a human face is included in the face detection region of the digital image;
   selecting an enlargement region of the image using a first strategy if a human face is determined to be included in the face detection region of the digital image and a second strategy if a human face is determined not to be included in the face detection region of the digital image;
   enlarging the enlargement region selected; and
   displaying the enlarged region on a display unit.

2. The method of claim 1, wherein the step of determining whether the human face is included in the digital image further comprises:
   extracting color information of the digital image and comparing the extracted color image with at least one skin color.

3. The method of claim 1, the step of selecting an enlargement region of the image further comprising:
   if a human face is determined to be included in the image, selecting an image enlargement region that includes the human face.

4. The method of claim 3, wherein the step of selecting an enlargement region of the image further comprises:
   searching for a T-shaped portion of the image formed by eyes, nose, and mouth on the human face and
   if the T-shaped portion is detected, selecting an image enlargement region including the T-shaped portion.

5. The method of claim 1, wherein the step of selecting an enlargement region of the image is performed by the digital camera.

6. The method of claim 1, wherein the step of selecting an enlargement region of the image is performed via user input.

7. The method of claim 1, wherein the step of selecting an enlargement region of the image further comprises:
   if a human face is determined not to be included in the digital image, dividing the image into at least two regions; and
   selecting the region having the largest amount of edge information.

8. The method of claim 1, wherein the digital camera sets the face detection region.

9. The method of claim 8, wherein a central portion of the image is set as the face detection region in which to detect the existence of a human face, the central portion being smaller than the digital image, the central portion including a point at the center of the central portion, the point being substantially equidistant from the right and left sides of the digital image.

10. The method of claim 1, wherein the method further comprises the step of displaying the digital image on the display unit, and wherein the user sets the face detection region to detect the human face from the image displayed on the display unit.

11. The method of claim 1, wherein the method further comprises the initial step of:
    displaying the image.

12. The method of claim 1, the step of selecting an enlargement region of the image comprising:
    if a human face is determined to be included in the digital image, selecting an image enlargement region that includes the human face; and
    if a human face is determined not to be included in the digital image, dividing the image into at least two regions and selecting the region having the largest amount of edge information.

13. The method of claim 1, wherein the display unit is an LCD screen.

14. A digital camera comprising:
    an optical system;
    an optoelectric converter that converts light from the optical system into an electrical analog signal;
    an analog-to-digital converter that converts the analog signal into a digital signal;
    a digital signal processor that processes the digital signal;

a microcontroller;

a recording medium:

a display;

a means for setting a predetermined face detection region of a digital image, the face detection region being smaller than the digital image;

a means for detecting a human face in the face detection region of the digital image;

a means for selecting a first strategy if a human face is detected in the face detection region and selecting a second strategy if a human face is not detected in the face detection region;

a means for selecting an image enlargement region using the selected first strategy if a human face is detected in the face detection region of the digital image and the selected second strategy if a human face is not detected in the face detection region of the digital image, wherein the image enlargement region selected using the first strategy includes the human face;

a means for dividing the image into at least two regions if a human face is not detected in the face detection region of the digital image;

a means for implementing the second strategy comprising selecting the image region having the largest amount of edge information as the image enlargement region; and a means for enlarging the selected image enlargement region.

15. The digital camera of claim 14, further comprising:

a means for detecting a T-shaped portion of the image formed by eyes, nose, and mouth on a human face.

16. The digital camera of claim 14, wherein the means for detecting a human face in a digital image, the means for selecting an image enlargement region, the means for dividing the image into at least two regions, the means for implementing the second strategy, and the means for enlarging the selected image enlargement region each comprises a digital signal processor.

17. The digital camera of claim 14, wherein the means for detecting a human face in a digital image, the means for selecting an image enlargement region, the means for dividing the image into at least two regions, the means for implementing the second strategy, and the means for enlarging the selected image enlargement region each comprises a microcontroller.

18. The digital camera of claim 14, wherein the means for detecting a human face in a digital image comprises a digital signal processor.

19. The digital camera of claim 14, wherein the means for detecting a human face in a digital image comprises a microcontroller.

\* \* \* \* \*